United States Patent [19]

Furuto et al.

[11] 4,421,946
[45] Dec. 20, 1983

[54] HIGH CURRENT CAPACITY SUPERCONDUCTOR

[75] Inventors: Yoshio Furuto; Shinichiro Meguro, both of Shinagawa; Takuya Suzuki; Ikuo Ito, both of Nikko; Toshinari Ando, Ibaragi; Masataka Nishi, Ibaragi; Susumu Shimamoto, Ibaragi, all of Japan

[73] Assignees: The Furukawa Electric Co., Ltd.; Japan Atomic Energy Research Institute, both of Tokyo, Japan

[21] Appl. No.: 230,952

[22] PCT Filed: May 16, 1980

[86] PCT No.: PCT/JP80/00105
§ 371 Date: Jan. 8, 1981
§ 102(e) Date: Jan. 8, 1981

[87] PCT Pub. No.: WO80/02619
PCT Pub. Date: Nov. 27, 1980

[30] Foreign Application Priority Data

May 18, 1979 [JP] Japan .................................. 54-61169

[51] Int. Cl.³ ............................................ H01B 12/00
[52] U.S. Cl. .................................. 174/128 S; 29/599; 174/155; 174/126 S; 335/216
[58] Field of Search .................. 174/15 C, 15 S, 110, 174/126 S, 128 S, 15 CA; 335/216; 29/599

[56] References Cited

U.S. PATENT DOCUMENTS

| 3,428,925 | 2/1969 | Bogner et al. | 335/216 |
| 3,527,873 | 9/1970 | Brechna et al. | 174/15 S |
| 3,731,374 | 5/1973 | Suenaga et al. | 29/599 |
| 3,743,986 | 7/1973 | McInturff et al. | 335/216 |
| 3,764,725 | 10/1973 | Kafka | 174/15 C |
| 3,767,842 | 10/1973 | Bronca et al. | 174/126 S |
| 3,954,572 | 5/1976 | Ziegler et al. | 174/126 S X |
| 4,079,187 | 3/1978 | Fillunger et al. | 174/15 S |
| 4,094,060 | 6/1978 | Madsen et al. | 29/599 |
| 4,148,129 | 4/1979 | Young | 29/599 |
| 4,329,539 | 5/1982 | Tanaka et al. | 174/128 S |

Primary Examiner—Volodymyr Y. Mayewsky
Attorney, Agent, or Firm—Frishauf, Holtz, Goodman and Woodward

[57] ABSTRACT

The present invention relates to a high current capacity superconductor having a high current density and high stability suitable as a superconductive coil for a large superconductive magnet. In a composite superconductor (1) having superconductive wires (2) and an electrically and thermally highly conductive stable metal (4) electrically coupled in the longitudinal direction, a high current capacity composite superconductor characterized by having an inorganic compound film (5) on the surface of the stabilizing metal (4).

12 Claims, 6 Drawing Figures

HIGH CURRENT CAPACITY SUPERCONDUCTOR

TECHNICAL FIELD

The present invention relates to a high current capacity superconductor which permits a high current density and has high stability as a coil for a large superconductive magnet.

BACKGROUND ART

It is generally necessary to suppress to a suitable value the inductance of a large superconductive magnet used for nuclear fusion reactors, MHD generators, and superconductive magnetic energy storage. Consequently, the rated current must necessarily be a high current of over 10 kA. With such a large superconductive magnet, high reliability is required from the perspective of safety, and the superconductor used for this must be designed to be fully stable. That is, the conductor must be so designed that it is capable of returning to the super conductive state after a cause has been eliminated, even when such cause broke the superconductive state of the superconductor leading to the transition to the resistive state. For this purpose, a great amount of a stabilizing metal is formed composite with the superconductor. Such a large superconductive element must further have sufficient strength to withstand the large electromagnetic force exerted on the coil. It thus becomes necessary to make the super conductor itself composite with a reinforcing material. When a large superconductor is designed based simply on the principle of small or medium sized superconductors which have been available heretofore, the conductor has an extremely large conductive area and a low current density, fails to provide suitable applicability to nuclear fusion reactors, MHD generators, and so on due to large size of the superconductive magnet incorporating this, and becomes uneconomical and impractical.

Various other types of superconductors have thus been proposed, all of which permit a high current density and have high stability and high resistance to stress. As an example, it has been proposed to use aluminum as a stabilizing metal which has a small magnetic reluctance in a high magnetic field. However, aluminum is low in mechanical strength and has high peizoelectric resistance effects, so it becomes necessary to connect an aluminum layer with a large amount of a reinforcing material so that the resultant composite structure has high resistance to stress. The use of aluminum as a stabilizing metal does not contribute to a higher current density at all. As an another method, it has been proposed to form a number of projections on the surface of the stabilizing metal of a composite superconductor, for example, to form parallel grooves (longitudinal grooves) along the longitudinal direction of the conductor and to form a group of transverse grooves crossing these longitudinal grooves, so as to increase the cooling area contacting the cooling medium and to improve the cooling efficiency of the surface of the stabilizing metal, thereby reducing the amount of the stabilizing metal used and increasing the current density. The cooling characteristics improve when such grooves are formed in the stabilizing metal to increase the cooling area. However, the cooling characteristics do not improve in proportion to the increase in the cooling area, but show saturation. Formation of such a number of grooves by decreasing the distance between the grooves to increase the cooling area requires special processing equipment. The drop in processing efficiency leads to an increase in cost. The great electromagnetic force is exerted under the superconductive condition as a surface pressure on the conductor surface through a spacer arranged for insulation. This results in deformation and crushing of the projections, that is a kind of fins, between the grooves when they are thin so that the cooling effects are degraded.

DICLOSURE OF INVENTION

The present inventors have made extensive studies to eliminate these problems and have developed a high current capacity superconductor allowing a high current density and having high stability. In a composite superconductor in which superconductive wires and a metal of high electrical and thermal conductivity, that is, a stabilizing metal, are electrically coupled in the longitudinal direction, the present invention provides a high current capacity composite superconductor having an inorganic compound film on the surface of the stabilizing metal.

BEST MODE OF CARRYING OUT THE INVENTION

Figure 1:
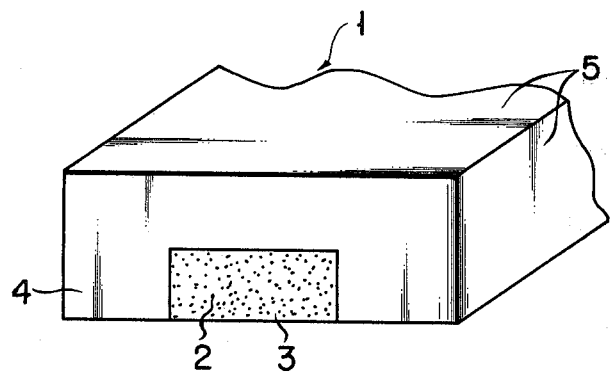
FIG. 1 is a perspective view illustrating an example of a high current capacity composite superconductor according to the present invention.

Describing the present invention referring to the accompanying drawings, FIG. 1 is a perspective view of a high current capacity composite superconductor 1 of the present invention in which a number of superconductive wires 2 are embedded in a stabilizing metal base body 3, and this whole structure is further embedded in its longitudinal direction in one side of a stabilizing metal strip 4. A film of an inorganic compound 5 is formed on the surface of the stabilizing metal strip 4. With the high current capacity composite superconductor, the construction is relatively simple. However, the thermal conductivity in liquid helium is extremely improved, so that high stability and high current density are obtained.

The superconductive wires used are wires or filaments of alloy superconductors such as Nb-Ti or Nb-Zr or compound superconductors such as $Nb_3Sn$ or $V_3Ga$. In the present invention, a number of superconductive wires are used as embedded in a matrix of a stabilizing metal such as copper or aluminum, or alongside the stabilizing metal base body. The structure in which the superconductive wires and the stabilizing metal base body are electrically and mechanically coupled together is generally called a composite superconductor. For manufacturing a relatively short composite superconductor, a composite billet obtained by embedding a predetermined number of superconductive rod bodies in a billet of a stabilizing metal base body is extruded in a small diameter. For obtaining an elongate composite superconductor, an elongate composite superconductive wire is formed with small diameter by extrusion as described above, wire drawing, and so on. A plurality of such wires are stranded and are optionally compressed by roll processing or the like. They are soldered to the stabilizing metal strip to be integral therewith to provide the objective elongate composite superconductor. The construction, shape and the manufactureing method of the composite superconductor are not limited in the present invention.

According to the present invention, the surface of the stabilizing metal base body of the composite superconductor is generally covered with a film of an inorganic compound such as an oxide or sulfide of the stabilizing metal. However, the present invention is not limited to this but the following procedure may alternatively be taken. A metal which forms a film of an inorganic compound of superior thermal conductivity is formed by plating or the like on the surface of the stabilizing metal. The metal surface is then oxidized or sulfurized to form an oxide or a sulfide. In modified embodiments, when the stabilizing metal is copper, a nickel layer may be formed and its surface is oxidized to form a film of nickel oxide. When the stabilizing metal is in another modified embodiment, a copper film is formed, and its surface is oxidized to form a film of copper oxide.

As methods for forming such inorganic compounds, chemical treatment methods such as chromatic acid treatment, potassium permanganate treatment, and ebonol treatment are suggested for forming a film consisting of a mixture of copper oxide and copper suboxide. With these methods, an oxide film is obtained with a granular laminated structure of 0.05 to 1 $\mu$m particle size and 0.3 to 3 $\mu$m layer thickness. With the electrolytic method, an oxide of a granular laminated structure with a larger particle size and layer thickness is obtained than that obtained with the chemical treatment method. The method incorporating electrolysis is preferable with respect to the heat transfer characteristics. As for a film of a mixture of copper sulfide and copper oxide, a film of several to 20 $\mu$m thickness is obtained by the chemical treatment method or electrolytic method. For forming an Alumite film on the surface of aluminum, it is preferable to perform electrolytic anodic oxidation at a high voltage (50 to 200 V) in a sulfuric acid or oxalic acid bath, which provides a relatively great cell diameter (about 1 $\mu$m) and layer thickness (10 to 50 $\mu$m). However, hole sealing treatment generally performed for improving the corrosion resistance and voltage resistance is not preferable since it degrades the heat transfer characteristics.

In the present invention, the inorganic compound formed on the stabilizing metal preferably is granular in its microscopic crystal structure which a suitable particle size, and has a structure such that particles are laminated to a suitable thickness.

The effects of the inorganic compound film on the cooling characteristics of a stabilizing metal surface in liquid helium were tested and the results will be described referring to FIG. 2.

The test was conducted in the following manner.

A copper block 13 mm in thickness, 21 mm in width and 50 mm in length was used as a sample. A heater of nichrome wire and a Ge thermometer were embedded in the sample, and the sample was immersed in liquid helium with the longitudinal direction of the sample being vertical. The heater power was increased at a constant rate from 0, and the temperature rise of the sample was simultaneously measured with the Ge thermometer. The obtained boiling curves are shown in FIG. 2 in which the heat flux obtained by dividing the heater power by the surface area of the heat transfer area is plotted along the ordinate, and the difference between the temperature of each sample and that of the liquid helium (4.2 k) was plotted along the abscissa.

Two surfaces 21 mm wide×50 mm long were adopted as the heat transfer surfaces of the sample, and the other four surfaces were thermally insulated with bakelite. As a typical example of the surface with grooves, 10 longitudinal grooves, each 1 mm in width and 1.5 mm in depth, were formed at 1 mm intervals on one surface, so that 20 grooves were formed altogether on both surfaces of the sample. Ebonol treatment was adopted as the chemical treatment to form a film of copper oxide on the heat transmitting surfaces. In FIG. 2, the transition heat flux (qt) is the heat flux when going from the nuclear boiling condition to the film boiling condition of the liquid helium. The recovery heat flux (qr) is the heat flux when returning from the film boiling condition to the nuclear boiling condition. Both qt and qr are preferably high for the cooling characteristics of the superconductor.

Figure 2:
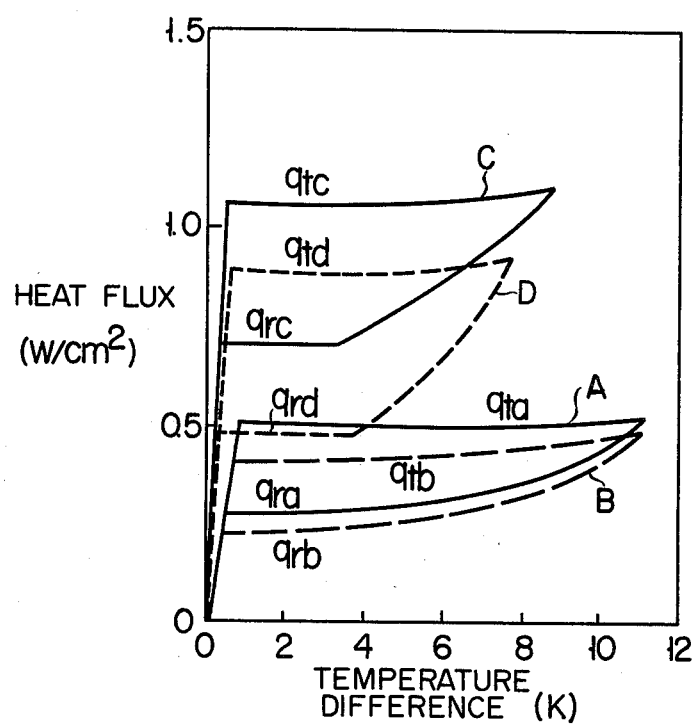
FIG. 2 is a graph showing heat flux curves of the surface of the stabilizing metal representing the cooling characteristics of the high current capacity composite superconductor according to the present invention in liquid helium.

As may be apparent from FIG. 2, with the heat flux curve A when the film of copper oxide is formed as the stabilizing metal, on the surface of the copper base material, the transition heat flux $qt_a$ is increased by about 20% over $qt_b$, and the recovery flux $qr_a$ is slightly increased relative to $qr_b$, as compared with the heat flux curve B when the film of copper oxide is not formed.

With the heat flux curve C when grooves are formed on the surface of the copper base material and the film of copper oxide is formed, the transition heat flux $qt_c$ is increased by about 20% over $qt_d$ and the recovery heat flux $qr_c$ is increased by more than 60% over $qr_d$, as compared with the heat flux curve D when the grooves are formed but the film of copper oxide is not formed.

It is considered to be attributable to the synergetic effects of the grooves and inorganic ompound film that the transition heat flux and the recovery heat flux are extremely improved when the grooves are formed on the surface of the stabilizing metal and the inorganic compound film is formed, as compared with the case when only the grooves are formed. This may be further supported from the fact that the increase rate (about 60%) of the recovery heat flux obtained when the inorganic compound film is formed on the surface of the stabilizing metal with grooves is much greater than the increase rate (about 10%) of the recovery heat flux (qr) obtained when the inorganic compound film is formed on the surface of the stabilizing metal. Although this phenomenon is not clarified yet, it is considered at this point that the film of the inorganic compound formed on the surface of the stabilizing metal has a granular lamnated microscopic structure, and the transition heat flux (qt) increases due to the increase in the number of nucleur centers at the nuclear boiling region. The increase in the recovery heat flux (qr) is considered to be attributable to the separation of the bubbles of gasified helium from the stabilizing metal surface, which is accelerated by the action of the granular laminated material and the action of the grooves.

Astonishing effects are obtained by forming structures a number of concaves such as grooves and convexes on the surface of the stabilizing metal and by further forming a film of an inorganic compound. Although both the transition heat flux (qt) and the recovery heat flux (qr) are improved, the improvement in the recovery heat flux (qr) is particularly outstanding so that this contributes to improve the characteristics of the superconductor. When the superconductor changes from the superconductive state to the resistive state, electrical resistance is induced in the conductor so that Joule heat is generated. The superconductor can return to its superconductive state when the cooling speed of the liquid helium is high enough, that is, when the amount of heat dissipation is greater than that of the heat generation in this manner. As a condition for recovering the superconductive state, the next relation is known: $Ir = \sqrt{qrPa/\rho}$ wherein Ir is the recovery current (the superconductor cannot return to the superconductive state when a current greater than this flows), qr is the recovery heat flux as described above, P is the peripheral length of the section perpendicular to the longitudinal direction of the superconductor (usually called the perimeter), A is the sectional area of a cross section perpendicular to the longitudinal direction of the superconductor, and $\rho$ is the electric resistivity of the superconductor in the sensitive state. As may be apparent from this relation, when the recovery heat flux (qr) increases, the recovery current Ir also increases in proportion to the square root of qr so that the characteristics of the superconductor are improved. Thus, with the recovery current Ir, it is possible to make the conductor sectional area A smaller by the increase of qr with the same superconductor, so that the amount of the stabilizing metal may be reduced and the current density of the conductor may be improved.

Although the shape of a number of the concaves and convexes formed on the surface of the stabilizing metal of the composite superconductor is not particularly limited according to the present invention, grooves of various sectional shapes obtained by general groove processing are economically practical. For example, rectangular grooves having no acute-angled projections as used in the above test, which have not been considered effective for improving the heat transfer characteristics in liquid helium, may be used combination with the inorganic compound film to provide excellent effects. Since the groove shape is not complex, grooves may be formed with a plastic processing technique suitable for mass-production of the elongate conductor without using a particular groove processing technique. Further, since there are no acute-angled projections between the grooves, the surface pressure exerted on the conductor through the insulation spacer when the coil is excited is received by a flat surface as a whole, so that the deformation of the grooves due to the surface pressure is substantially eliminated, thereby providing a coil which is strong against the electromagnetic force. Although it is preferable to direct the grooves along the longitudinal direction of the superconductor for suppressing the electrical resistance of the stabilizing metal and for making the manufacture of the superconductor easy, transverse grooves perpendicular or oblique to the longitudinal grooves may be formed, or the wires may be knurled for enlarging the surface area.

Figure 3:
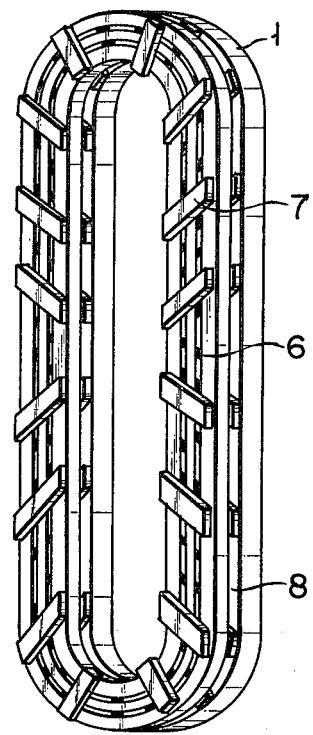
FIG. 3 is a perspective view of a pancake type coil of race track shape incorporating the high current composite superconductor of the present invention.

The high current capacity composite superconductor of the present invention is mainly used in a coil for a superconductive magnet. It is thus necessary that the inorganic compound film formed on the surface of the stabilizing metal be in direct contact with liquid helium to be directly cooled thereby. Since the superconductor 1 is used, for example, as shown in FIG. 3, as a pancake type coil of a face track shape, turns and layers must be electrically insulated. As shown in FIG. 3, electrically insulating spacers 6 are interposed among the turns of the coils and electrically insulating spacers 7 are disposed among the layers of the coil. However, since the inorganic compound film formed on the surface of the stabilizing metal must directly contact the liquid helium as effectively as possible, it is necessary to make the ratio of the film covered by the spacers smaller. Thus, the spacers are disposed at suitable intervals. With such a construction, the spaces between the respective spacers provide channels for the liquid helium when the pancake type coils are superposed on top of each other (only two layers are shown in FIG. 3 for the sake of simplicity). It is preferable to dispose these spacers obliquely as shown in FIG. 3 so that the bubbles of helium generated on the surface of the conductor are efficiently released and exhausted.

It is preferable to use the high current capacity composite superconductor of the present invention under the condition that it is not directly in contact with the adjacent superconductors, so that it will make contact with the liquid helium over the widest area. Thus, it is preferable to electrically insulate the films with spacers or the like even when the inorganic compound films formed on the surfaces of the stabilizing metal are sufficiently electrically insulating.

The present invention will now be described with reference to its examples.

EXAMPLE 1

The size of the conductor was 7 mm×7 mm. The sectional area ratio (Cu/SC) of copper to Nb-Ti at the section of the conductor was 8. A superconductive flat rectangular wire was prepared with 1,180 Nb-Ti filaments, each 80 μm in diameter, embedded in a copper matrix. Ebonol treatment (immersing in a solution of 100 g/l of $NaClO_2$ and 100 g/l of NaOH at 70° to 80° C. for several minutes) was performed on the surface of the copper of the conductor. A pancake coil of 14 turns 200 mm in inner diameter and 300 mm in outer diameter was manufactured without adhering any insulating tape between the turns of the conductor. The coil was inserted in a biasing magnet. The critical current was measured in a biasing magnetic field of 7T, and a value of 4,600 A was obtained. This value corresponds to the critical current of the short sample within an error range of 1 to 2%. Next, after inserting a heater in the pancake coil and forcibly transiting the part of the conductor to the resistive state, current was passed through the pancake coil. The enlargement of the shrinkage of the resistive part was measured. The equiarea heat flux qe was obtained to be 0.36 $W/cm^2$. This presented 20 to 40% improvement over qe (0.25 to 0.30 $W/cm^2$) for the case of the general unprocessed copper surface. During this test, the cooling of the conductor was performed through both side surfaces of the conductor. The mechanical strength was not affected by the ebonol treatment; and was high, 36.4 $kg/mm^2$ for the tensile strength and 27.0 kg/mm² for 0.2% proof strength, both at room temperature.

EXAMPLE 2

Figure 4:
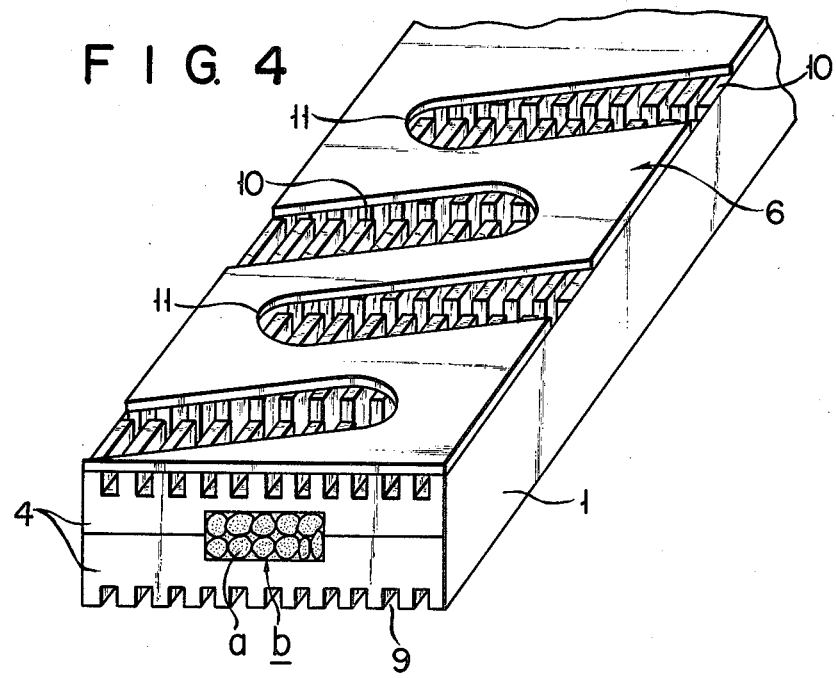
FIG. 4 is a perspective view of the high current capacity composite superconductor of the present invention obtained in Example 2.

Fifteen composite superconductive fine wires a (conductors having a Cu/SC ratio of 2.0 with 2,300 Nb-Ti filaments of 18 μm diameter embedded in oxygen free copper) of 1.5 mm diameter were stranded and rolled into a flat rectangular shape to provide a formed stranded cable b, whose surface was then coated with Pb-Sn solder, as shown in FIG. 4. On one side of a copper strip 4 of 5 mm×20 mm size as the stabilizing metal were formed 11 grooves 9 of 0.7 mm width and 1 mm depth in the longitudinal direction and transverse grooves 10 of 0.7 mm width and 1 mm depth at 1 mm intervals perpendicularly to the longitudinal grooves in the similar manner. Chemical treatment (immersing in a bath of 8 g/l of potassium permanganate and 60 g/l of sulfuric acid at 70° to 80° C.) was performed on the grooved surface to form a film of copper oxide. Between two such copper strips 4, the formed stranded cable b was soldered as shown in FIG. 4 to provide an embedded composite superconductor 1. Using the conductor 1, a spacer 6 (covering 50% of the total surface area) having oblique notches 11 as shown in FIG. 4 was mounted on the grooved surface of the conductor. The conductor was wound around an FRP bobbin of 200 mm outer diameter to form a solenoid. This coil was inserted in a biasing magnet and current was passed through it under a magnetic field of 8T. A critical current of 5,600 A was obtained. This corresponds to the critical current of the short sample with an error within the range of 1 to 2%. Then, a test of superconductive-resistive state transition was conducted with a heater embedded in the formed stranded wire in advance. A high equiarea heat flux of $qe=0.92$ W/cm² was obtained. The reason why such high characteristics were obtained even though 50% of the heat transfer area was covered with the spacer are partially attributable to the fact that the heat transfer characteristics of the surface of the conductor are extremely improved due to the combination of the chemical treatment and the groove processing. In addition to this reason, the following causes are very plausible. The heat transfer of the surface covered by the spacers is generally extremely degraded as compared with that obtained with the exposed surface. However, since the surface of the conductor of the example has a number of grooves 9, channels for liquid and/or gaseous helium are also present under the spacer. It is considered that the small degradation of the heat transfer characteristics thus obtained partially contributes for attaining the high heat transfer characteristics.

EXAMPLE 3

Figure 5:
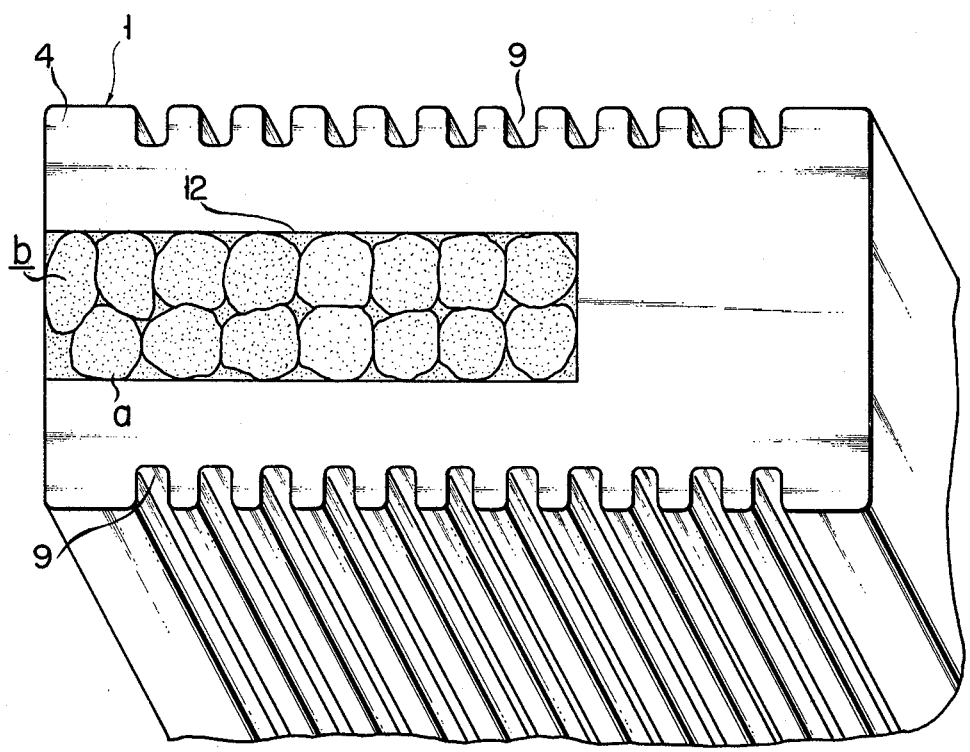
FIG. 5 is a perspective view of the high current capacity composite superconductor of the present invention obtained in Example 3.

As shown in FIG. 5, 11 longitudinal grooves a were formed for each of the two wider surfaces of the copper strip 4 as the stabilizing metal, and a longitudinal deep recess 12 was formed at one of another side surface. The Nb-Ti superconductive formed stranded cables b were embedded in the recess 12 by soldering to provide a composite superconductor 1 of 200 m length. The Nb-Ti formed stranded cable b was obtained by stranding and compressing as in Example 2 fifteen of the composite super conductive fine wires a having 1,270 Nb-Ti filaments of 50 μm diameter embedded in oxygen free copper. The copper strip 4 as the stabilizing metal is 27 mm in width and 12.8 mm in thickness and has 22 longitudinal grooves 9 of 1 mm width and 1.5 mm depth on the upper and lower surfaces. The copper strip 4 further has on its side surface a groove 12 of 5 mm width and 17 mm depth to insert the formed stranded cables b. The same chemical treatment was performed as in Example 2, except on the groove 12, to form a film of copper oxide on the surface of the copper strip 4. The inner surface of the groove 12 of the copper strip 4 is preliminarily plated with solder, and the formed stranded cables b were inserted therein. They were formed integrally by continuous heating and soldering. A short sample of 1 m was taken from the composite superconductor 1 thus obtained, and the heat transfer characteristics from the grooved surface 9 to the liquid helium were measured. High heat fluxes of 1.04 W/cm² for the transition heat flux (qt) and 0.77 W/cm² for the recovery heat flux (qr) were obtained. One of the special features of the manufacturing process of the composite superconductor 1 of this example is that, before integrally forming the Nb-Ti formed stranded cables b and the copper strip 4 by soldering, ebonol treatment is performed on the copper strip 4 except where soldering is necessary. Due to this, the heat transfer characteristics are improved, and adherence of the solder to the heat transfer surfaces during the soldering step is prevented so that a sufficient amount of solder may be supplied for soldering, and soldering with an extremely small number of voids is possible. Further, the finishing step for removing the solder adhering to the unnecessary parts by, for example, buffing, is eliminated so that the entire process may be shortened. Then, measurements of the critical current were performed for the short sample. The measurement of the composite superconductor 1 requires a great power source of a capacity over 20 kA. Due to the limits imposed by the testing equipment, samples of 50 cm were taken from the individual composite superconductive fine wires a and were measured for critical current. The average critical current was 1,360 A under a magnetic field of 8T. Based on this result, the critical current of the composite superconductor 1 as a whole was calculated to be 20,400 A under a magnetic field of 8T. The mechanical strength of the composite superconductor 1 was measured with the short samples. The tensile strength was 35.8 kg/mm², 0.2% proof strength was 25.7 kg/mm², and the elongation was 18.3%. Thus, degradation of the mechanical strength due to the chemical treatment was not observed.

EXAMPLE 4

Figure 6:
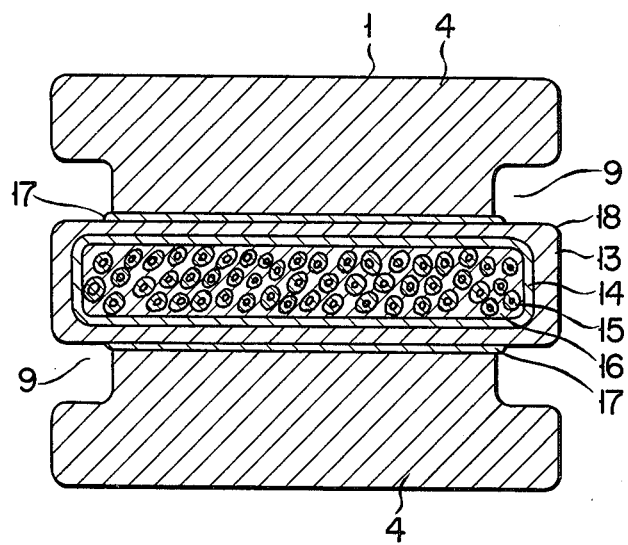
FIG. 6 is a sectional view of the high current capacity composite superconductor of the present invention obtained in Example 4 as cut along a section perpendicular to the longitudinal direction of the superconductor.

Two profile copper strips 4 as the stabilizing metal were adhered with solder 17 to both sides of an Nb₃Sn flat rectangular conductor 18 as shown in FIG. 6 to provide a composite superconductor 1 of 6.6 mm×8.4 mm size and 10 m length. The structure of the conductor was as follows. The Nb₃Sn flat rectangular conductor 18 was 8.4 mm in width and 2 mm in thickness. Embedded in the Nb₃Sn flat rectangular conductor 18 were 116,000 Nb filaments 15 of 5 μm diameter surrounded by an Nb₃Sn layer formed by diffusion heat treatment, the filaments being twisted at a pitch of 90 mm in a matrix of Cu-Sn bronze 16. The conductor 18 further had a copper layer 13 occupying 15% of the sectional area outside the matrix through a Ta layer 14 of 120 μm thickness which provided a diffusion blocking wall. The copper strip 4 was 8.4 mm in width and 2.3 mm in thickness and had a stepped part 9 of dimensions 1 mm×1 mm at both its ends continuously extending in the longitudinal direction. Thus, by soldering the copper strips (two) to both sides of the Nb₃Sn flat rectangular conductor 18, four continuous grooves 9 of 1 mm width and 1 mm depth were formed along the longitudinal direction for cooling the conductor. Ebonol treatment was continuously performed in a bath on the composite superconductor 1 to form a film of copper oxide over the entire surface of the conductor. Using this composite superconductor 1, a pancake coil of 300 mm inner diameter, 385 mm outer diameter, and ten turns was prepared and inserted in a biasing magnet. A magnetic field of 10T was applied and the critical current was measured to be 4,500 A. Using a heater embedded in the solder layer 17 in advance, a test of superconductive resistive state transition was conducted and an equiarea heat flux (qe) of 0.55 W/cm² was obtained.

The following effects are obtainable according to the present invention:

(1) The stability of the superconductor and the total current density as a coil are extremely improved since the heat transfer characteristics to the liquid helium is excellent.

(2) The superconductor may be manufactured at an extremely low cost since the preparation of the stabilizing metal is easy, the plastic processing is efficient and the continuous chemical treatment with a simple device is possible.

(3) In the case of a conductor having grooves on the cooling surface, degradation of the cooling characteristics is small, since grooves below the spacers serve as channels of liquid and/or gaseous helium even when the spacer covers the heat transfer surfaces.

(4) Since the high heat transfer characteristics are obtained with a simple groove configuration a planar contact with the spacers and a larger contact area are provided, and the superconductor is firmed against the surface pressure.

(5) When the grooves are continuous in the longitudinal direction, the increase in the electric resistance due to the reduction in the conductor sectional area caused by the formation of the grooves is small, providing an advantageous composite superconductor with respect to the stability.

(6) When an inorganic compound film is formed on the surface of the stabilizing metal except the soldering part and thereafter the integral formation by soldering is performed in the manufacturing process of the composite superconductor, the adherance of the solder on the cooling surface may be prevented and the high heat transfer characteristics may be obtained while shortening the process.

INDUSTRIAL APPLICABILITY

The present invention provides a high current capacity composite superconductor suitable as a coil conductor of a large superconductive magnet used, for example, in a nuclear fusion reactor, an MHD generator, a superconductive magnetic energy storage device and so on. A high current capacity composite superconductor has extremely improved cooling characteristics in liquid helium so that the amount of a stabilizing metal used may be reduced and a higher current density may be obtained. Thus, the high current capacity composite superconductor is more suitable for the devices as described above and is industrially useful.

We claim:

1. In a composite superconductor having superconductive wires and electrically and thermally high conductive stabilizing metal electrically coupled in the longitudinal direction of the superconductive wires, a high current capacity superconductor to be used in direct contact with a liquid coolant wherein the improvement comprises an inorganic compound film formed on the surface of the stabilizing metal.

2. In the high current capacity composite superconductor according to claim 1, the further improvement wherein the surface of the inorganic compound film is covered with an electrically insulating spacer so as to be partially exposed.

3. In the high current capacity composite superconductor according to claim 1 or 2, the further improvement wherein said stabilizing metal has a number of concaves and convexes on the surface thereof.

4. In the high current capacity composite superconductor according to claim 3, the further improvement wherein the concaves and convexes are parallel grooves or ribs extending in the longitudinal direction of the superconductor.

5. In the high current capacity composite superconductor according to claims 1 and 2, the further improvement wherein the stabilizing metal is copper and the inorganic compound film is a film of copper oxide.

6. In a composite high current capacity superconductpr at least a portion of which is in direct contact with a liquid coolant, the superconductor having a plurality of superconductive wires and electrically and thermally high conductive stabilizing metal electrically coupled in the longitudinal direction of the superconductive wires, at least a portion of said stabilizing metal being in direct contact with said cooling liquid, the improvement wherein an inorganic compound film is formed on at least the surface portions of said stabilizing metal and in direct contact with said liquid coolant to promote the cooling accompanied by a phase change of said liquid coolant.

7. In the high current capacity composite supeconductor according to claim 6, the further improvement wherein the surface of the inorganic compound film is covered with an electrically insulating spacer so as to be partially exposed.

8. In the high current capacity composite superconductor according to claim 6 or 7, the further improvement wherein said stabilizing metal has a number of concaves and convexes on the surface thereof.

9. In the high current capacity composite superconductor according to claim 8, the further improvement wherin concaves and convexes are parallel grooves or ribs extending in the longitudinal direction of the superconductor.

10. In the high current capcity composite superconductor according to claim 6 or 7, the further improvement wherein the stabilizing metal is copper and the inorganic compound film is a film of copper oxide.

11. In the composite superconductor according to claim 1 or 6, the further improvement wherein said liquid coolant comprises liquid helium which is subjected to nuclear boiling during heat transfer from said superconductor to said liquid coolant.

12. In the composite superconductor according to claim 6, the further improvement wherein said superconductor having said plurality of superconductive wires comprises a coil conductor of a superconductive magnet.

* * * * *

UNITED STATES PATENT AND TRADEMARK OFFICE
CERTIFICATE OF CORRECTION

PATENT NO. : 4,421,946
DATED : December 20, 1983
INVENTOR(S) : Yoshio FURUTO et al It is certified that error appears in the above-identified patent and that said Letters Patent is hereby corrected as shown below:

COLUMN 3, line 34, after "stabilizing metal" delete "is in another" and insert --is aluminum in another--;

COLUMN 10 (claim 9), line 51, change "wherin" to --wherein--;

COLUMN 10 (claim 10), line 54, change "capcity" to --capacity--.

Signed and Sealed this

Seventh Day of August 1984

[SEAL]

Attest:

GERALD J. MOSSINGHOFF

Attesting Officer  Commissioner of Patents and Trademarks